United States Patent
Brock

[11] Patent Number: 6,135,059
[45] Date of Patent: Oct. 24, 2000

[54] DOG TRAINING AND EXERCISING DEVICE

[76] Inventor: Robert A. Brock, 1100 Shore Dr., Anchorage, Ak. 99515

[21] Appl. No.: 09/196,014

[22] Filed: Nov. 19, 1998

[51] Int. Cl.[7] ............................. A01K 15/02; B62H 19/00
[52] U.S. Cl. ......................... 119/702; 119/771; 280/416; 280/292
[58] Field of Search ..................................... 119/702, 784, 119/769, 771; 280/202, 204, 416, 87.021, 87.041, 292

[56] References Cited

U.S. PATENT DOCUMENTS

| | | |
|---|---|---|
| 622,500 | 4/1899 | Kuster . |
| 656,998 | 8/1900 | McDonald et al. . |
| 667,154 | 1/1901 | McDonald et al. . |
| 671,478 | 4/1901 | Grimme . |
| 1,855,172 | 4/1932 | Hess . |
| 2,629,611 | 2/1953 | Covington . |
| 2,645,505 | 7/1953 | Durand . |
| 3,603,609 | 9/1971 | Hott et al. ................................... 280/62 |
| 3,695,626 | 10/1972 | Alexander, Jr. ........................ 280/28.14 |
| 3,751,062 | 8/1973 | White, Sr. ............................ 280/87.042 |
| 4,134,364 | 1/1979 | Boncela . |
| 4,189,166 | 2/1980 | Lindsey ..................................... 280/234 |
| 4,203,610 | 5/1980 | Mihalik ................................ 280/87.041 |
| 4,941,670 | 7/1990 | Parr ..................................... 280/87.021 |
| 5,033,409 | 7/1991 | Sabot ....................................... 119/703 |
| 5,215,037 | 6/1993 | Allred ...................................... 119/771 |
| 5,375,561 | 12/1994 | Gundersen ............................... 119/771 |
| 5,842,445 | 12/1998 | Barbour ................................... 119/771 |
| 5,992,864 | 11/1999 | Dickson et al. .................... 280/87.041 |

*Primary Examiner*—Peter M. Poon
*Assistant Examiner*—Yvonne R. Abbott
*Attorney, Agent, or Firm*—Michael J. Tavella

[57] ABSTRACT

A modified scooter that has a frame with a low center portion. A rider stands on this center portion. A front wheel is mounted to a fork and has steering control as in the case of a normal scooter. Extending forward from the frame is a curved tow member. The curved tow member acts as a transfer bow. It is designed to fasten to a tow rope, which is then attached to a dog or dogs. The position and attachment point of the transfer bow are designed to transfer the pulling force to a point low on the center of gravity of the scooter. This keeps the scooter stable under all operating conditions. The scooter can be a hauling sled also. By lengthening the frame and adding additional wheels, the scooter can carry loads. The transfer bow can be attached to other types of wheeled vehicles as well to achieve similar results.

19 Claims, 5 Drawing Sheets

DOG TRAINING AND EXERCISING DEVICE

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the invention

This invention relates to dog training and exercising devices and particularly to dog training and exercise devices that are used while a dog or dogs pull the device.

2. Description of related art

Skijoring is a sport that was developed in Norway. There, people on skis are pulled along a trail by a dog or dogs. The skier is pulled using a rope that is fastened around the skier's waist. Once in harness and underway, the skier can simply ride on the skis, or can work the skis by skating or using other techniques. To work, skijoring takes a great deal of coordination between the skier and the dog or dogs. The best way to achieve this coordination is through practice.

Unfortunately, during the summer months, practicing skijoring is difficult. While it may be possible to hitch up a wagon, being pulled in a wagon does little to develop the sense of timing the skier needs while skiing. Skijoring while on in-line skates is extremely dangerous as they have poor braking capability and generate high speeds. Most people use a wagon to exercise the dogs in summer. However, as discussed above, the wagon is not the best way to train the dogs. Moreover, the specialized wagons used for skijoring training are expensive.

BRIEF SUMMARY OF THE INVENTION

To overcome these problems, a new training device has been developed. The device is a modified scooter. The scooter has a frame that has low center portion. A rider stands on this center portion. The scooter has two wheels. The front wheel is mounted to a fork and has steering control as in the case of a normal scooter. A brake system is also provided to stop the scooter.

Extending forward from the frame is a curved tow member. The curved tow member is designed to fasten to a tow rope, which is then attached to a dog or dogs. The position and attachment point of the tow member are designed to transfer the pulling force to a point low on the center of gravity of the scooter. This keeps the scooter stable under all operating conditions. The key to the successful operation of this device is the curved to member. This member is called a transfer bow in that it transfers the pulling force from the front of the scooter to a point having a low center of gravity on the scooter with a rider on board.

Using the scooter, an operator can ride the scooter while being pulled by a dog. The operator also can pump the scooter using his or her legs. This provides a somewhat more realistic driving experience for both the dog and the operator.

By modifying the frame, the scooter can become a hauling sled also. By lengthening the frame and adding additional wheels, the scooter can carry loads. Such a scooter can be used to help train mushing dogs as well.

The transfer bow can be used on other vehicles as well, such as bicycles, tricycles or other wheeled vehicles, to achieve similar results.

DETAILED DESCRIPTION OF THE INVENTION

Figure 1:
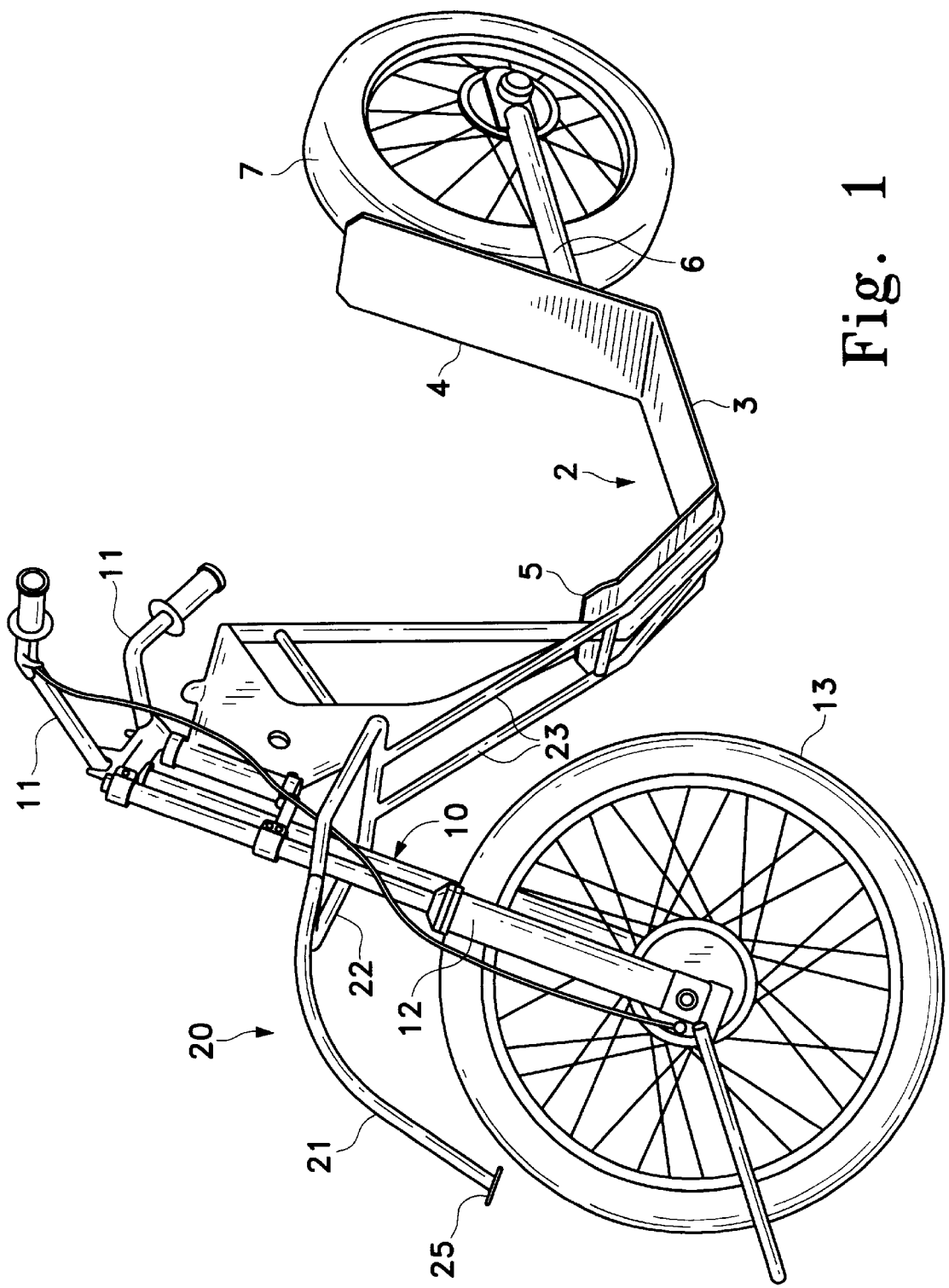
FIG. 1 is a perspective view of the first embodiment of the invention.
Figure 2:
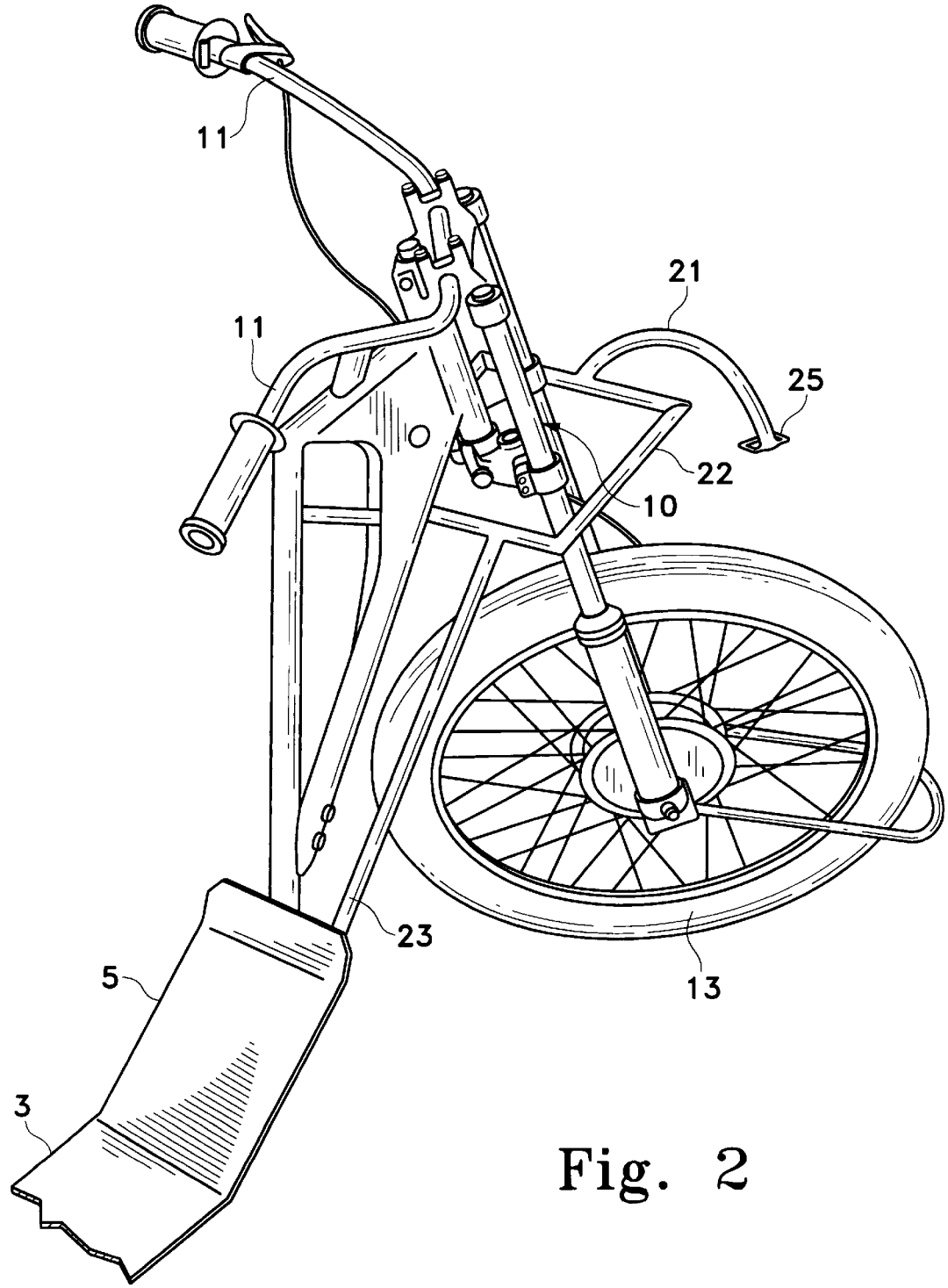
FIG. 2 is a perspective detail view of the tow member.
Figure 3:
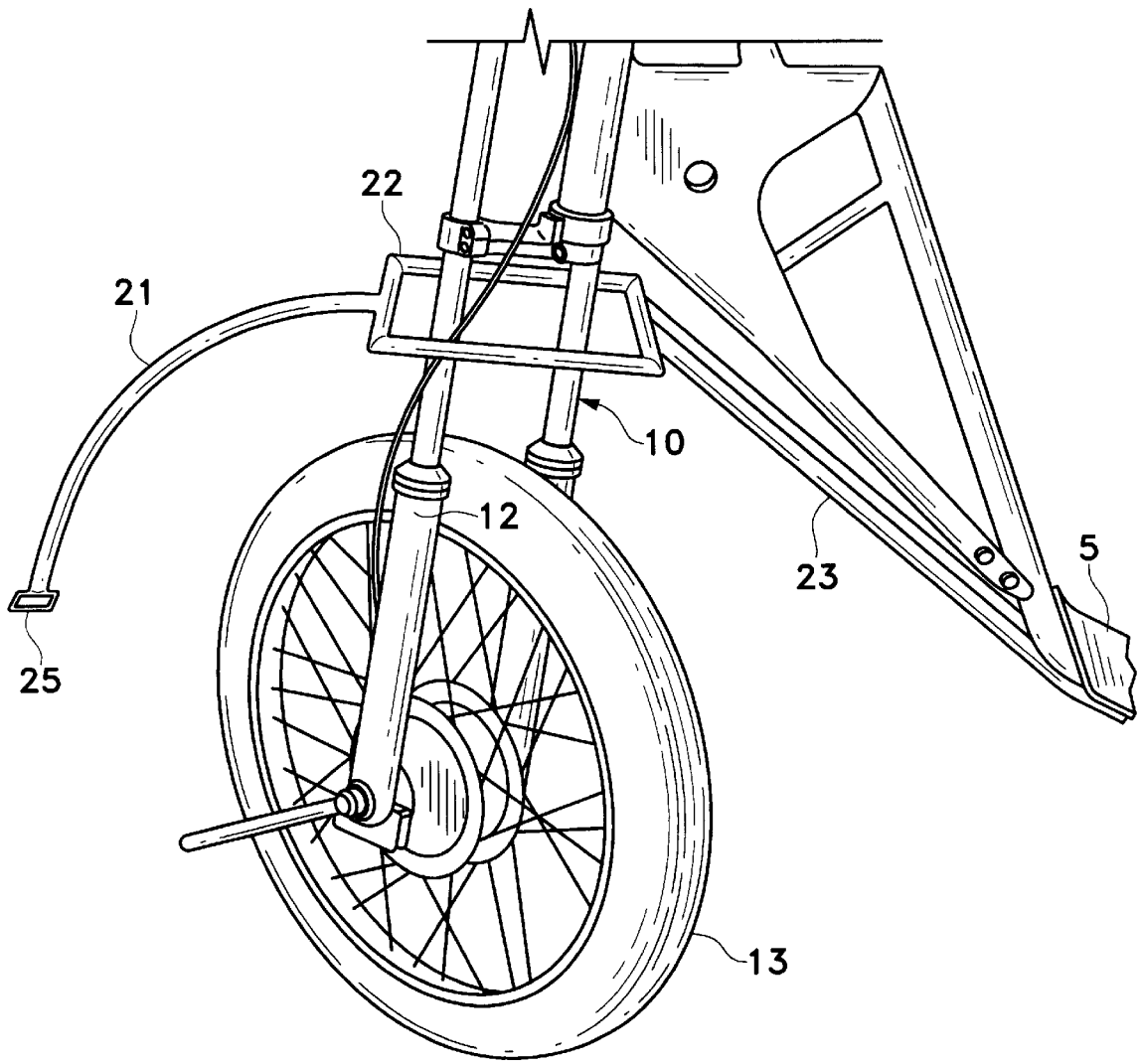
FIG. 3 is a perspective detail view of the tow member, shown from the opposite side from that of FIG. 2.

Referring now to FIGS. 1, 2 and 3, the preferred embodiment 1 has a central frame 2. The frame 2 has a base portion 3 a rear fender portion 4 and a forward portion 5. A rear fork 6 extends behind the rear fender portion 4. The rear fork supports a back wheel 7. A forward fork and steering system 10 is attached to the forward portion 5 as shown. This system 10 has a pair of handlebars 11 and front forks 12. The front forks 12 hold the front wheel 13 as shown. Conventional shock absorbers and brakes are provided in the normal manner. So far, what has been described is a step-type scooter that has a heavy duty front suspension. A tow bar system 20 is attached to the forward portion 5. This system has a curved tow bar 21, and a rectangular frame member 22. The back of the rectangular frame member 22 is attached to the forward portion 5 of the frame 2 at a pair of support members 23. These support members 23 transfer the pulling force to the base of the scooter, which transfers the pulling force to a lower point on the device. The combination of the curved tow bar 21, the frame member 22 and the support members 23 is called a transfer bow, in that the transfer bow is used to transfer the pulling force from the front of the device to a point having a low center of gravity compared to the overall device with a rider. This makes the device inherently stable when being pulled and eliminates the possibility of the device being pulled over when being towed. FIGS. 2 and 3 show the tow bar system 20 from two other angles.

At the other end of the tow bar 21 is a fitting 25 that allows standard towing lines and equipment to be attached. These lines are used to attach one or more dogs to the device. The operator places one foot on the base and calls for the dogs to move. As the scooter gets underway, the operator can push with one foot until the scooter is up to speed. At this point, the operator can place both feet on the scooter and ride. If needed, the operator can pump the scooter as desired. The operator steers the scooter using the handlebars in the usual manner.

By placing the towing bar in the location shown, the dog or dogs pull the scooter in a manner very similar to that during skijoring. As a result, the dogs not only are exercised in the summer, they experience the same sensations as that in the winter. Steering and other operations are identical to those experienced in the winter. Thus, the dogs receive full training as well as exercise.

Figure 4:
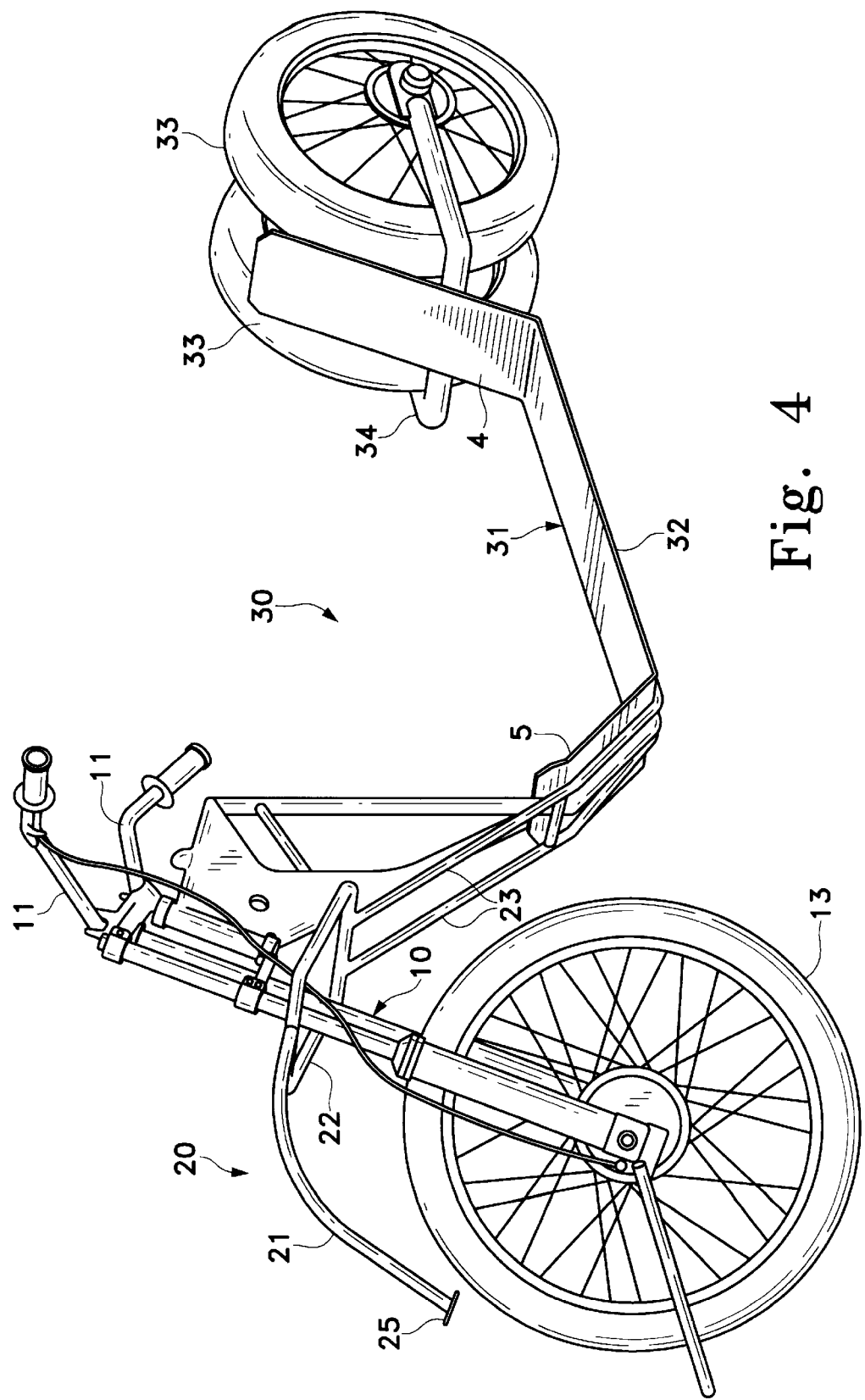
FIG. 4 is a perspective view of a second embodiment of the invention.

FIG. 4 shows a second embodiment 30 of the invention. Here, the base portion 32 of the base frame 31 is elongated to carry more people or loads. To provide additional support for the load, a pair of rear tires 33 is used. The rear fork 34 is widened to hold the two tires. All other aspects of the device are the same as above.

Figure 5:
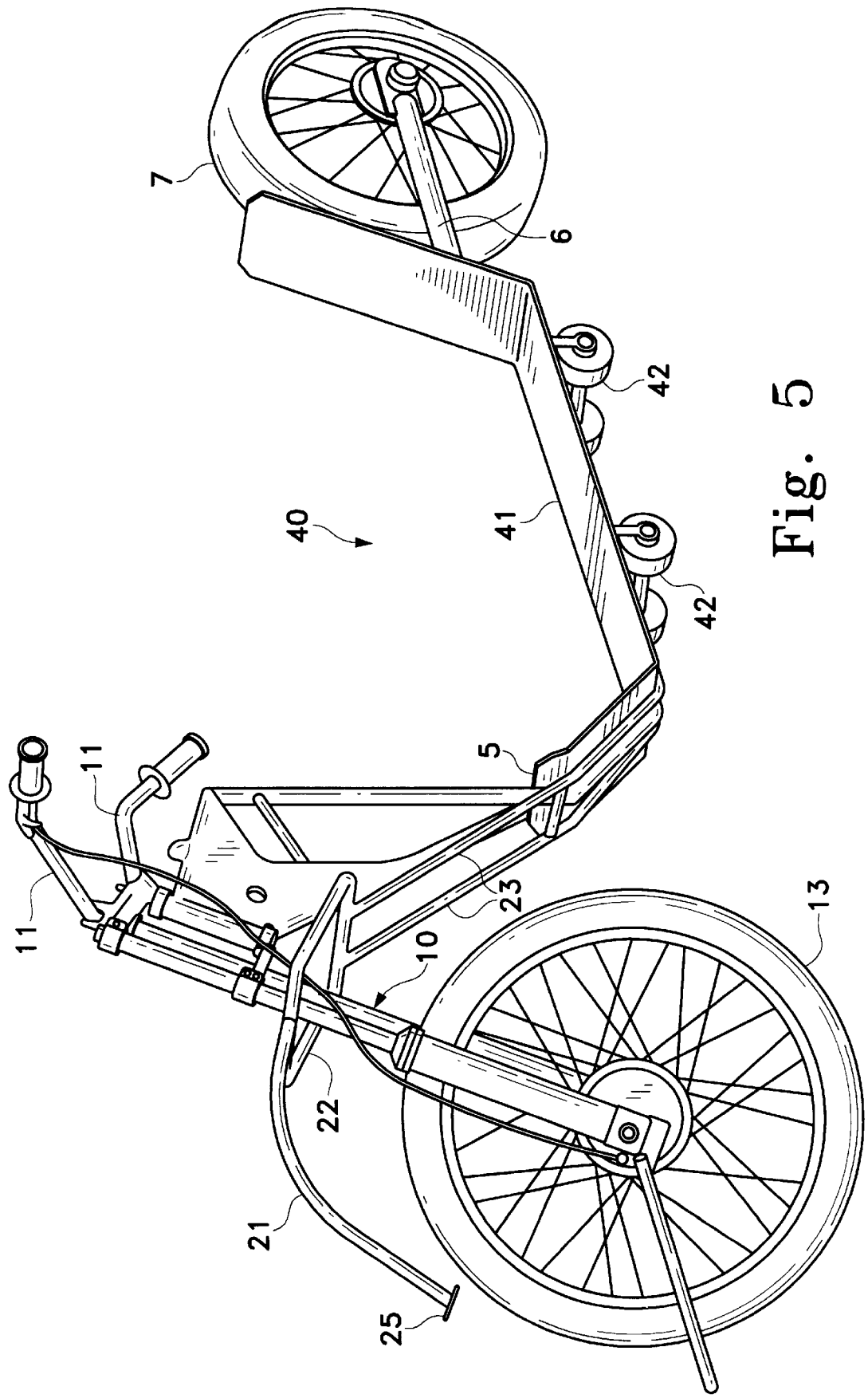
FIG. 5 is a perspective view of a third embodiment of the invention.

FIG. 5 shows another embodiment of the invention 40. In this embodiment, the base plate 41 is elongated. Here, to provide support for the base plate, two pairs of wheels 42 are positioned beneath the base plate 41 a shown. These wheels support the base plate and keep it from hitting the ground under heavy loads.

Finally, the device can be used with other types of vehicles as well. For example, small bicycles, tricycles or similar vehicles can be used with the transfer bar, as discussed above, to achieve similar results. These other vehicles are not preferred because they typically require the rider to sit on a seat. This does not simulate the experience of skijoring, which is normally done standing. There is not much adjustment that needs to be made when using these other vehicles. The main thing to remember is that the connection of the transfer bow to the frame of the vehicle must be made at the lowest available point on the frame to ensure a proper transfer of the pulling force.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A device for training dogs comprising:
   a) a frame;
   b) at least one rear wheel;
   c) a means for attaching said rear wheel to said frame;
   d) at least one front wheel;
   e) a means for attaching said front wheel to said frame, including a fork;
   f) a transfer bow, having a front end and a rear end, said front end extending forward of said front wheel, said front end of said transfer bow also having a means for attaching a towing line thereto, and further wherein said rear end of said transfer bow is fixedly attached to said frame such that a pulling force exerted on said front end of said transfer bow is transferred to said frame at a point on said frame having a low center of gravity with respect to a rider riding said device; and further, wherein said transfer bow is not attached to said fork.

2. The device of claim 1 further comprising a means for steering said device, operably attached to said front fork member.

3. The device of claim 1 wherein the frame is a generally flat, rectangular support, said rectangular support also having a front and a back.

4. The device of claim 3 wherein the transfer bow is attached to the front of said rectangular support.

5. The device of claim 1 further comprising a plurality of auxiliary support wheels, attached to said frame.

6. The device of claim 5 further comprising a second rear wheel, operably connected to said means for connecting said rear wheel.

7. The device of claim 1 further comprising a second rear wheel, operably connected to said means for connecting said rear wheel.

8. The device of claim 1 further comprising a seat, attached to said frame.

9. A device for training dogs comprising:
   a) a generally rectangular frame, having a front and a back, said front end being angled upward with respect to said generally rectangular frame;
   b) at least one rear wheel;
   c) a means for attaching said rear wheel to said generally rectangular frame;
   d) at least one front wheel;
   e) a means for attaching said front wheel to said generally rectangular frame, including a fork;
   f) a transfer bow, having a front end and a rear end, said front end extending forward of said front wheel, said front end of said transfer bow also having a means for attaching a towing line thereto, and further wherein said rear end of said transfer bow is fixedly attached to the front of said generally rectangular frame such that a pulling force exerted on said front end of said transfer bow is transferred to said generally rectangular frame at a point on said generally rectangular frame having a low center of gravity with respect to a rider riding said device; and further, wherein said transfer bow is not attached to said fork.

10. The device of claim 9 wherein the means for attaching said front wheel include a front fork member.

11. The device of claim 10 further comprising a means for steering said device, operably attached to said front fork member.

12. The device of claim 9 wherein the generally rectangular frame acts as a standing platform for a rider.

13. The device of claim 9 wherein said generally rectangular frame has a bottom, and further wherein a plurality of auxiliary support wheels is attached to the bottom of said generally rectangular frame to support said generally rectangular frame when said device is in use.

14. The device of claim 13 further comprising a second rear wheel, operably connected to said means for connecting said rear wheel.

15. The device of claim 9 further comprising a second rear wheel, operably connected to said means for connecting said rear wheel.

16. A device for training dogs comprising:
   a) a frame;
   b) at least one rear wheel;
   c) a means for attaching said rear wheel to said frame;
   d) at least one front wheel;
   e) a means for attaching said front wheel to said frame, including a fork;
   f) a transfer bow having a forward portion, a bridging portion, and a rear portion, wherein the front portion is fixedly attached to said bridging portion and said rear portion is fixedly attached to said bridging portion, and further wherein said bridging portion has a open center, and further whereby said fork passes through said open center of said bridging portion such that said fork does not contact said bridging portion;
   g) a means for attaching a tow line operatively attached to the forward portion of said transfer bow; and
   h) a means for attaching the rear portion of said transfer bow to said frame such that that a pulling force exerted on said forward portion of said transfer bow is transferred to said frame at a point on said frame having a low center of gravity with respect to a rider riding said device.

17. The device of claim 16 further comprising a means for steering said device, operably attached to said fork.

18. The device of claim 16 wherein the frame acts as a standing platform for a rider.

19. The device of claim 16 wherein said frame has a bottom, and further wherein a plurality of auxiliary support wheels is attached to the bottom of said frame to support said frame when said device is in use.

* * * * *